(12) United States Patent
Vrubel et al.

(10) Patent No.: US 12,701,002 B2
(45) Date of Patent: Aug. 4, 2026

(54) METHOD OF OPTIMIZING LINEAR TRANSFORMATION

(71) Applicant: Chain Reaction, Ltd., Tel Aviv (IL)

(72) Inventors: Oren Vrubel, Tel Aviv (IL); Noam Kleinburd, Hashmonaim (IL); Ilan Rosenfeld, Petah Tikva (IL)

(73) Assignee: Chain Reaction, Ltd., Tel Aviv (IL)

( * ) Notice: Subject to any disclaimer, the term of this patent is extended or adjusted under 35 U.S.C. 154(b) by 0 days.

(21) Appl. No.: 18/789,018

(22) Filed: Jul. 30, 2024

(65) Prior Publication Data

US 2025/0300806 A1     Sep. 25, 2025

Related U.S. Application Data

(60) Provisional application No. 63/568,472, filed on Mar. 22, 2024.

(51) Int. Cl.
*H04L 9/30* (2006.01)
*G06F 21/57* (2013.01)
*H04L 9/00* (2022.01)

(52) U.S. Cl.
CPC .......... *H04L 9/3026* (2013.01); *G06F 21/575* (2013.01); *H04L 9/008* (2013.01); *G06F 2221/034* (2013.01)

(58) Field of Classification Search
CPC ..... H04L 9/3026; H04L 9/008; G06F 21/575; G06F 2221/034
See application file for complete search history.

(56) References Cited

U.S. PATENT DOCUMENTS

| | | | |
|---|---|---|---|
| 7,280,696 B2 | 10/2007 | Zakrzewski et al. | |
| 9,281,941 B2 | 3/2016 | Gentry et al. | |
| (Continued) | | | |

FOREIGN PATENT DOCUMENTS

| | | |
|---|---|---|
| CN | 116192361 A | 5/2023 |
| CN | 116488788 A | 7/2023 |
| (Continued) | | |

OTHER PUBLICATIONS

Wonkyung et al. "Over 100x faster bootstrapping in fully homomorphic encryption through memory-centric optimization with GPUs.", IACR Transactions on Cryptographic Hardware and Embedded Systems (2021): 114-148; Apr. 23, 2021, https://ia.cr/2021/508 (Year: 2021).*

(Continued)

*Primary Examiner* — Meng Li
(74) *Attorney, Agent, or Firm* — M&B IP Analysts, LLC

(57) ABSTRACT

A method and system for optimizing compute runtime and memory footprint of a linear transformation process are provided. The method includes determining a set of optimal rotation parameters, wherein the optimal rotation parameters provide an optimal tradeoff between runtime compute resources and a memory footprint for a runtime execution of the linear transformation process; initializing the linear transformation process to run a boosting technique with the determined set of optimal rotation parameters, wherein the boosting technique, when executed at runtime as part of the linear transformation process, performs at least one iteration that yields rotated ciphertexts, and wherein the at least one iteration is based on the determined set optimal rotation parameters and at least one key switching key (KSK); and loading the initialized linear transformation process to an internal memory of a hardware accelerator.

21 Claims, 5 Drawing Sheets

(56)                 References Cited

U.S. PATENT DOCUMENTS

| | | | | |
|---|---|---|---|---|
| 9,906,360 | B2 | 2/2018 | Johnson et al. | |
| 10,075,288 | B1 | 9/2018 | Khedr et al. | |
| 12,155,746 | B1 | 11/2024 | Crockett | |
| 2013/0170640 | A1 | 7/2013 | Gentry | |
| 2013/0216044 | A1 | 8/2013 | Gentry et al. | |
| 2016/0164670 | A1 | 6/2016 | Gentry et al. | |
| 2016/0164676 | A1* | 6/2016 | Gentry | H04L 9/08 |
| | | | | 380/30 |
| 2017/0149796 | A1 | 5/2017 | Gvili | |
| 2018/0109376 | A1 | 4/2018 | Gentry et al. | |
| 2019/0278600 | A1 | 9/2019 | Frumkin et al. | |
| 2019/0334694 | A1* | 10/2019 | Chen | H04L 9/0631 |
| 2019/0394019 | A1* | 12/2019 | Gao | H04L 9/008 |
| 2020/0076570 | A1 | 3/2020 | Musuvathi et al. | |
| 2020/0084017 | A1 | 3/2020 | Bent et al. | |
| 2020/0228307 | A1 | 7/2020 | Cheon et al. | |
| 2020/0403781 | A1 | 12/2020 | Gentry et al. | |
| 2021/0058229 | A1 | 2/2021 | Jiang et al. | |
| 2021/0194666 | A1 | 6/2021 | Georgieva et al. | |
| 2021/0211290 | A1 | 7/2021 | Jindal et al. | |
| 2021/0211291 | A1 | 7/2021 | Jindal et al. | |
| 2021/0328766 | A1 | 10/2021 | No et al. | |
| 2022/0172050 | A1 | 6/2022 | Dalli et al. | |
| 2022/0271922 | A1* | 8/2022 | No | G06F 7/523 |
| 2022/0360428 | A1 | 11/2022 | Creeger et al. | |
| 2022/0366059 | A1 | 11/2022 | Sasidharan Rajalekshmi et al. | |
| 2023/0019214 | A1 | 1/2023 | Prothero | |
| 2023/0112840 | A1 | 4/2023 | Micciancio et al. | |
| 2023/0145760 | A1 | 5/2023 | Cheon | |
| 2023/0216676 | A1 | 7/2023 | Lee et al. | |
| 2023/0291541 | A1 | 9/2023 | Gupta et al. | |
| 2023/0325529 | A1* | 10/2023 | Sav | H04L 9/0819 |
| | | | | 726/26 |
| 2023/0336567 | A1 | 10/2023 | Gvili | |
| 2023/0361986 | A1 | 11/2023 | Genise et al. | |
| 2023/0385061 | A1 | 11/2023 | Ren et al. | |
| 2024/0048355 | A1 | 2/2024 | Joye | |
| 2024/0106632 | A1 | 3/2024 | No et al. | |
| 2024/0154786 | A1 | 5/2024 | Hoshizuki et al. | |
| 2024/0171372 | A1 | 5/2024 | Kim et al. | |
| 2024/0171374 | A1* | 5/2024 | Tan | H04L 9/06 |
| 2024/0362343 | A1 | 10/2024 | Na et al. | |
| 2024/0364496 | A1 | 10/2024 | Chevallier-Mames et al. | |
| 2024/0396706 | A1 | 11/2024 | Dimou et al. | |
| 2024/0421971 | A1* | 12/2024 | Agrawal | H04L 9/008 |
| 2025/0005101 | A1* | 1/2025 | Taneja | G06F 17/14 |
| 2025/0023715 | A1 | 1/2025 | Bae | |
| 2025/0047484 | A1 | 2/2025 | Joye | |
| 2025/0055672 | A1 | 2/2025 | Bajpeyi et al. | |
| 2025/0112757 | A1 | 4/2025 | Kumar et al. | |
| 2025/0150254 | A1 | 5/2025 | Adir et al. | |
| 2025/0167976 | A1* | 5/2025 | Van Beirendonck | H04L 9/008 |
| 2025/0211435 | A1* | 6/2025 | Maji | H04L 9/008 |
| 2025/0266984 | A1 | 8/2025 | Cheon et al. | |
| 2025/0279886 | A1 | 9/2025 | Kao et al. | |
| 2025/0300806 | A1* | 9/2025 | Vrubel | H04L 9/008 |
| 2025/0300807 | A1* | 9/2025 | Vrubel | H04L 9/3026 |
| 2025/0300832 | A1* | 9/2025 | Kleinburd | H04L 9/3026 |
| 2025/0337560 | A1 | 10/2025 | Bae et al. | |
| 2025/0343671 | A1 | 11/2025 | Bae et al. | |

FOREIGN PATENT DOCUMENTS

| | | | |
|---|---|---|---|
| CN | 117394982 | A | 1/2024 |
| EP | 4087177 | A1 | 11/2022 |
| KR | 102616119 | B1 | 12/2023 |

OTHER PUBLICATIONS

Over 100x faster bootstrapping in fully homomorphic encryption through memory-centric optimization with GPUs (Year: 2021).*
Bossuat, Jean-Philippe, Mouchet, Christian, Troncoso-Pastoriza, Juan, and Hubaux, Jean-Pierre, "Efficient Bootstrapping for Approxi-mate Homomorphic Encryption with Non-Sparse Keys" accessed Jul. 9, 2024.
Cheon, Jung Hee, Han, Kyoohyung, Kim, Andrey, Kim, Miran, and Song , Yongsoo, "Bootstrapping for Approximate Homomorphic Encryption", accessed Jul. 9, 2024.
Gentry, Craig, Halevi, Shai, Smart, Nigel P., "Better Bootstrapping in Fully Homomorphic Encryption", published Dec. 15, 2011, accessed Jul. 9, 2024.
Halevi, Shai, Shoup, Victor, "Bootstrapping for HElib", dated Apr. 20, 2020, pp. 1-38.
Jung, Wonkyung, Kim, Sangpyo, Ahn, Jung Ho, Cheon, Jung Hee, and Lee, Younho, "Over 100x Faster Bootstrapping in Fully Homomorphic Encryption through Memory-centric Optimization with GPUs", Published Aug. 11, 2021, vol. 2021, No. 4, pp. 114-148, accessed Jul. 9, 2024.
Kim, Andrey, Lee, Yongwoo, Deryabin, Maxim, Eom, Jieun, and Choi, Rakyong, "LFHE:Fully Homomorphic Encryption with Boot-strapping Key Size Less than a Megabyte", published May 26, 2023, accessed Jul. 9, 2024.
Kim, Jongmin, Lee, Gwangho, Kim, Sangpyo, Sohn, Glna, Kim, John, Rhu, Minsoo, Ahn, Jung Ho, "ARK:Fully Homomorphic Encryption Accelerator with Runtime Data Generation and Inter-Operation Key Rescue", May 3, 2022, pp. 1-14, Seoul National University.
Zhou, Minxuan, et al. "FHEmem: A Processing In-Memory Accel-erator for Fully Homomorphic Encryption", arXiv:2311.16293v1 [cs.AR] Nov. 27, 2023.
Cheon, Jung Hee, Han, Kyoohyung, Han, Minki, "Faster Homomorphic Discrete Fourier Transforms and Improved FHE Bootstrapping", accessed Dec. 23, 2024, pp. 1-18, Seoul National University, Seoul, Korea.
Kim, Jongmin, Kim, Sangpyo, Choi, Jaewan, Park, Jaiyoung, Kim, Donghwan, Ahn, Jung Ho, "Sharp: A Short-Word Hierarchical Accelerator for Robust and Practical Fully Homomorphic Encryp-tion", Jun. 17-21, 2023, pp. 1-15, ISCA'23, Orlando, Florida.
Lattigo, "Lattigo: lattice-based multiparty homomorphic encryption library in Go", Aug. 2024, Github, https://github.com/tuneinsight/lattigo, date accessed Dec. 23, 2024.
Samardzic, Nikola, Feldmann, Axel, Manohar, Nathan, Genise, Nicholas, Eldefrawy, Karim Peikert, Chris, "Crater Lake: A Hard-ware Accelerator for Efficient Unbounded Computation on Encrypted Data", Jun. 18-22, 2022, pp. 1-15, ISCA, New York, New York.
International Search Report for PCT/IB2025/050820, dated May 7, 2025. Searching Authority, Israel Patent Office, Jerusalem, Israel.
International Search Report for PCT/IB2025/050822, dated Apr. 30, 2025. Searching Authority, Israel Patent Office, Jerusalem.
International Search Report for PCT/IB2025/050824, dated May 7, 2025. Searching Authority, Israel Patent Office, Jerusalem, Israel.
Written Opinion of the Searching Authority for PCT/IB2025/050820, dated May 7, 2025. Searching Authority, Israel Patent Office, Jerusalem, Israel.
Written Opinion of the Searching Authority for PCT/IB2025/050822, dated Apr. 30, 2025. Searching Authority, Israel Patent Office, Jerusalem.
Written Opinion of the Searching Authority for PCT/IB2025/050824, dated May 7, 2025. Searching Authority, Israel Patent Office, Jerusalem, Israel.
Li, Ningbo et al. Efficient Multi-Key FHE With Short Extended Ciphertexts and Directed Decryption Protocol (Year: 2019).
Zhang, Kaiyuan et al. Hardware Acceleration for Fully Homomorphic Encryption Scheme Switching from CKKS to FHEW (Year: 2024).
Wu, et al. "Bootstrapping Optimization for Fully Homomorphic Encryption Schemes", Apr. 19, 2024, PREPRINT (Version 1) available at Research Square [https://doi.org/10.21203/rs.3.rs-4194403/v1] (Year: 2024).
Bossuat, et al.; "Efficient Bootstrapping for Approximate Homomorphic Encryption with Non-Sparse Keys, 2021" (Year: 2021).
Cheon, et al.; "Faster Homomorphic Discrete Fourier Transforms and Improved FHE Bootstrapping, 2021" (Year: 2018).
Jung et al. "Over 100x Faster Bootstrapping in Fully Homomorphic Encryption through Memory-centric Optimization with GPUs" (Year: 2021).

(56) References Cited

OTHER PUBLICATIONS

Reagen, et al.; "Cheetah: Optimizing and Accelerating Homomorphic Encryption for Private Inference, 2021" (Year: 2021).

* cited by examiner

METHOD OF OPTIMIZING LINEAR TRANSFORMATION

CROSS-REFERENCE TO RELATED APPLICATIONS

This application claims the benefit of U.S. Provisional Application No. 63/568,472 filed on Mar. 22, 2024, the contents of which are hereby incorporated by reference.

TECHNICAL FIELD

The present disclosure relates generally to fully homomorphic encryption (FHE) schemes and, more specifically, to a linear transformation.

BACKGROUND

FHE enables computations on encrypted data without needing to decrypt it first. The Cheon-Kim-Kim-Song (CKKS) scheme is one of the encryption methods used in FHE, particularly well-suited for dealing with arithmetic on complex numbers. The core feature of FHE is performing computations on encrypted data. With CKKS, one can perform addition, subtraction, and multiplication on ciphertexts. These operations correspond to similar operations on the original plaintext numbers. To make the scheme more efficient, a sequence of values can be encrypted into a single ciphertext, this sequence can be rotated. Importantly, CKKS allows for these operations to be performed with relatively low noise growth, which is a significant challenge in FHE. As operations are performed on ciphertexts, noise within the encrypted data accumulates. If the noise grows too large, it can make the decrypted result incorrect. CKKS also manages this noise by scaling down ciphertexts after multiplications.

The CKKS scheme includes a technique for controlling this noise called Rescaling, which also reduces the size of the ciphertext. When the size of a ciphertext reaches a threshold, the bootstrapping process can be applied. The bootstrapping process refreshes the ciphertext, increasing its size and enabling more computations to be performed. Bootstrapping is a crucial process that allows FHE schemes to practically perform an unlimited number of homomorphic computations on encrypted data.

CKKS is a potent FHE scheme, enabling arithmetic operations on approximate number vectors of length n. The scheme supports various operations such as addition, multiplication, scalar-by-vector multiplication, and rotation, among others. Operands can be plaintexts, ciphertexts, or a combination of both. Complex vector data is encoded into polynomials with integer coefficients modulo a chosen modulus, which is then encrypted into an array of such polynomials. Homomorphic operations involve arithmetic between polynomials, with efficient multiplication achieved through the Number Theoretical Transform (NTT) domain, also known as Evaluation-mode. Due to high modulus values, Residue-Number-System (RNS) representation is used to reduce complexity.

Each multiplication operation in CKKS consumes RNS residues, requiring decryption and re-encryption to maintain homomorphic arithmetic precision. An alternative, "bootstrapping" refreshes multiple RNS levels without decryption. The bootstrapping process is a complex process involving Coefficient-to-Slots (C2S) transformation, Sine Evaluation, and Slots-to-Coefficients (S2C) transformation. C2S and S2C transformations are similar to homomorphic Inverse Discrete Fourier Transform (IDFT) and Discrete Fourier Transform (DFT) evaluations, respectively. Both C2S and S2C transformations utilize auxiliary-data represented by matrices of complex powers of a root of unity, with the same format.

The related art describes a number of techniques to perform the linear transformation in the case of the bootstrapping process. FIG. 1 illustrates steps of a bootstrapping process 100 typically involves three major steps. The first step, 110, is the coefficients to slots (C2S) step, followed by a polynomial evaluation (Sine) 120, and the final step is the slots to coefficients (S2C) step 130. In an FHE scheme, an encrypted message is presented as a polynomial. The C2S step 110 homomorphically evaluates the inverse discrete-Fourier-transform (IDFT) and produces a ciphertext that can be evaluated. The Sine step 120 implements the homomorphic modular reduction on the ciphertext. The modular reduction is approximated by a sinusoidal (Sine) function, which scales the message down and produces a remainder polynomial of the modular operation (typically modulo 1). Then, the message is scaled back. The scheme parameters determine the range and degree of the approximation, where the Sine step 120 has to account for the secret-key density 'h'. The S2C step 130 homomorphically evaluates the DFT on the ciphertext to revert to approximately the original encrypted message.

The bootstrapping process is a crucial part of an application that performs FHE operations. Such a process is executed to ensure that noise resulting from operations does not grow too large, which may lead to an incorrect decrypted result. The frequency of executing the bootstrapping process is determined by the application programmer and must be frequent enough to maintain the accuracy of the decrypted result.

Bootstrap processing as well as other processes of FHE operations utilize linear transformation algorithms. Linear transformation may be a linear function used on encrypted data without decrypting it, which is useful for privacy-preserving computations in various applications, such as cloud computing and secure data analysis. Additionally, linear transformation algorithms can be used in applications, such as Linear Regression, Logistic Regression, Convolutional Neural Networks, and Large Language Models.

Generally, linear transformation processes are complex and require a significant amount of computational and memory resources. In order to effectively apply FHE schemes, such as bootstrapping, in real-time commercial applications, there is a need to accelerate the linear transformation operation.

It would, therefore, be advantageous to provide a solution that would minimize the amount of computational and memory resources when executing linear transformation processes.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include determining a set of optimal rotation parameters, where the optimal rotation parameters provide an optimal tradeoff between runtime compute resources and a memory footprint for a runtime execution of the linear transformation process. Method may also include initializing the linear transformation process to run a boosting technique with the determined set of optimal rotation parameters, where the boosting technique, when executed at runtime as part of the linear transformation process, performs at least one iteration that yields rotated ciphertexts, and where the at least one iteration is based on the determined set optimal rotation parameters and at least one key switching key (KSK). Method may furthermore include loading the initialized linear transformation process to an internal memory of a hardware accelerator. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: determine a set of optimal rotation parameters, where the optimal rotation parameters provide an optimal tradeoff between runtime compute resources and a memory footprint for a runtime execution of the linear transformation process; initialize the linear transformation process to run a boosting technique with the determined set of optimal rotation parameters, where the boosting technique, when executed at runtime as part of the linear transformation process, performs at least one iteration that yields rotated ciphertexts, and where the at least one iteration is based on the determined set optimal rotation parameters and at least one key switching key (KSK); and load the initialized linear transformation process to an internal memory of a hardware accelerator. Other embodiments of this aspect include corresponding computer systems, apparatus, and computer programs recorded on one or more computer storage devices, each configured to perform the actions of the methods.

In one general aspect, a system may include one or more processors configured to: determine a set of optimal rotation parameters, where the optimal rotation parameters provide an optimal tradeoff between runtime compute resources and a memory footprint for a runtime execution of the linear transformation process. System may furthermore include initialize the linear transformation process to run a boosting technique with the determined set of optimal rotation parameters, where the boosting technique, when executed at runtime as part of the linear transformation process, performs at least one iteration that yields rotated ciphertexts, and where the at least one iteration is based on the determined set optimal rotation parameters and at least one key switching key (KSK). System may in addition include load the initialized linear transformation process to an internal memory of a hardware accelerator. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
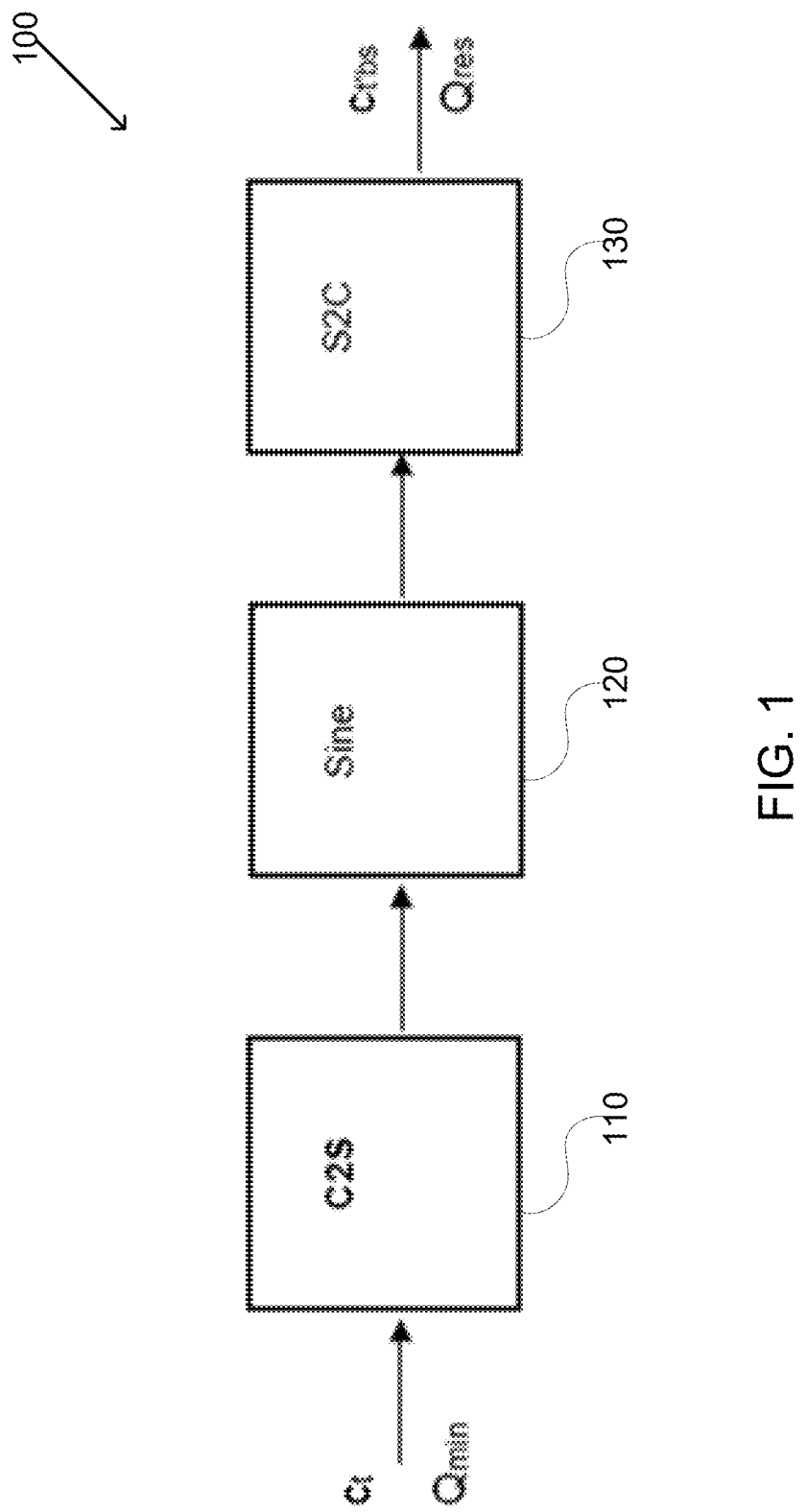
FIG. 1 illustrates the steps of a bootstrapping process in an FHE scheme.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed subject matter focuses on optimizing Fully Homomorphic Encryption (FHE) programs and bootstrapping processes, particularly in linear transformation. The aim is to enhance the linear transformation by efficiently performing addition, multiplication, and rotation of an unencrypted matrix with an encrypted vector to produce an encrypted output. Key objectives include reducing the external memory bandwidth, memory size, and computational efforts of FHE accelerators. This reduction leads to a smaller chip area and lower power consumption for ASIC accelerators. The disclosed embodiments can be implemented in various FHE schemes, such as CKKS and BGV/BFV, to make linear transformation more efficient for secure computations.

In the CKKS scheme, a vector $x \in \mathbb{C}^n$ of up to $n=N/2$ complex numbers is encoded into a plaintext polynomial of length N, typically with n in the range of $2^{10}$ to $2^{16}$. The encoded plaintext polynomial consists of $N=2n$ integer values modulo Q. This plaintext polynomial can then be encrypted into a ciphertext, which includes two polynomials, each containing $N=2n$ integer values modulo Q. It should be noted that encryption and decryption processes require a key and the notation $x \in \mathbb{C}^n$ represents a vector of complex numbers, ct=Encrypt(x) stands for ct=Encrypt (Encode(x)), and x=Decrypt(ct) stands for x=Decode (Decrypt (ct)).

The following are operations supported within this encryption framework.

a. Addition of ciphertexts, $y=\text{add}_{ct,ct}$ ($ct_A$, $ct_B$) results in Decrypt(y)≈Decrypt($ct_A$)+Decrypt($ct_B$) adding the decrypted values of two ciphertexts;

b. Multiplication of ciphertexts, $y=\text{mul}_{ct,ct}$ ($ct_A$, $ct_B$)⇒Decrypt(y)≈Decrypt($ct_A$)·Decrypt($ct_B$);

c. Multiplication between ciphertext and plaintext, $y=\text{mul}_{ct,pt}$($ct_A$, pt*)⇒Decrypt(y)≈Decrypt($ct_A$)·Decode (pt*);

d. And rotation of a ciphertext, $y=\text{rot}(ct_A, r)$⇒Decrypt(y) [k]≈Decrypt($ct_A$)[(k+r) % n] effectively rotating the decrypted vector by r positions.

These operations facilitate homomorphic encryption, enabling computations on encrypted data without decryption, which is particularly advantageous for ensuring data privacy in secure computation environments like cloud computing.

An FHE linear transformation is a frequently invoked algorithm or process in FHE computation in general, and in bootstrapping in particular. FHE linear transformation is used to evaluate the multiplication of an unencrypted matrix by an encrypted vector, resulting in an encrypted output. This operation is crucial for bootstrapping in client-to-server and server-to-client communications, as well as various other homomorphic encryption applications. Commercially available demonstrated an algorithm for homomorphic matrix multiplication, which utilizes existing homomorphic operations such as rotation (rot), multiplication of ciphertext and plaintext (mul_ct,pt), and addition of ciphertexts (add_ct,ct). This process is vital for secure computation and the practical implementation of homomorphic encryption.

The FHE linear transformation process usually involves four steps: 1) encoding diagonals, 2) rotating ciphertext, 3) multiplying diagonals by rotated ciphertext, and 4) summing the products. First, encode the diagonals of matrix A into plaintext polynomials. Next, rotate the ciphertext vector X to align with each diagonal. Then, multiply each diagonal by the corresponding rotated ciphertext and sum the results. For example, matrix A and vector X include encoding each diagonal, rotating X by the required positions, multiplying the encoded diagonals by the rotated ciphertexts, and summing these products. This process typically involves n−1 rotations and n ciphertext-plaintext multiplications; however, the computational effort can be reduced if there are fewer non-zero diagonals.

Figure 2:
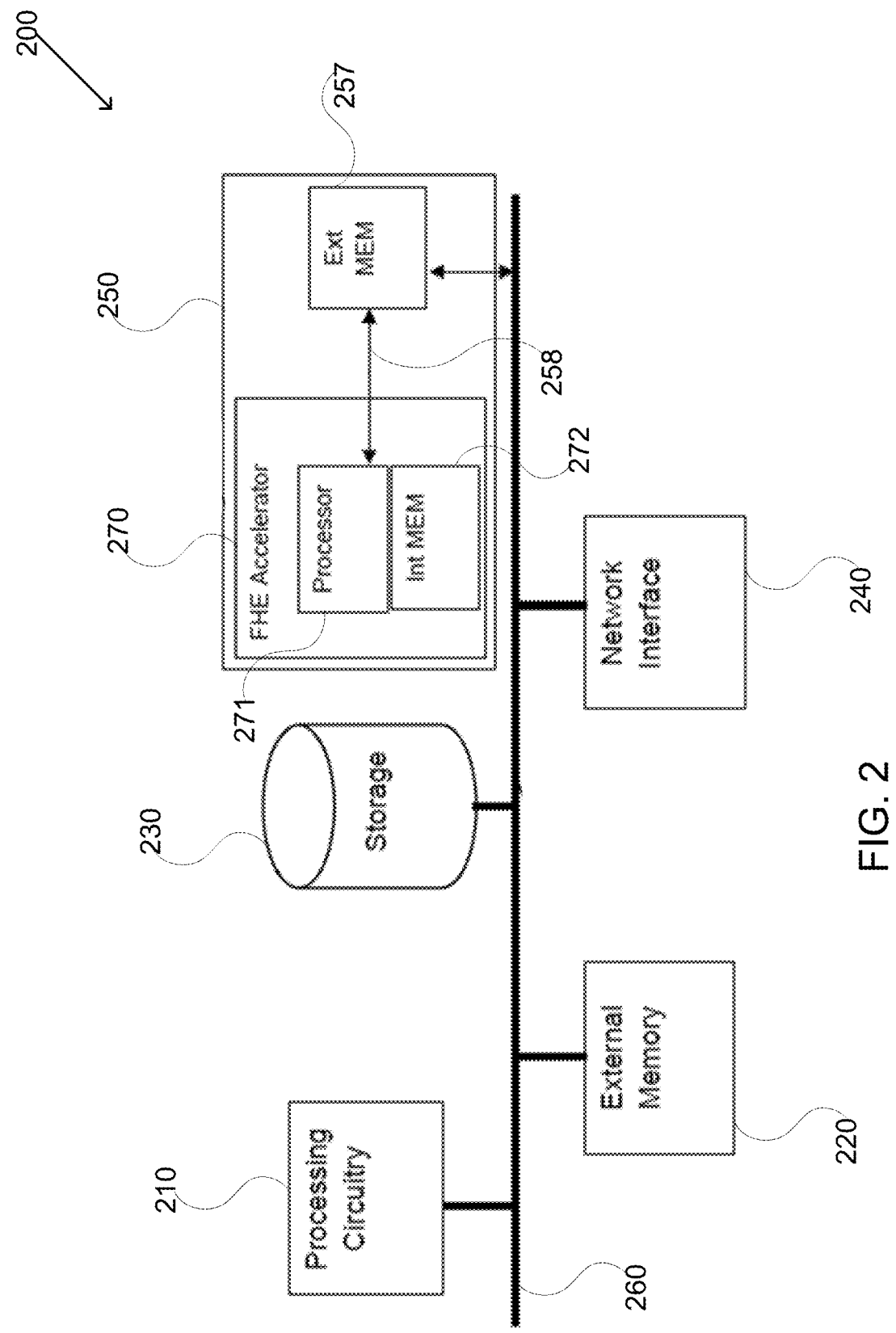
FIG. 2 is an example diagram of a server utilized to explain the various disclosed embodiments.

Linear transformation process can be summarized as follows:

a. Input: Ciphertext $ct_x$=Encrypt(x∈ $\mathbb{C}$ n), complex matrix $A_{n \times n}$ b. Output: Ciphertext $ct_y$ such that y=Decrypt($ct_y$)≈Ax c. Process:

i. Encode diagonals of A into n plaintext polynomials {$\text{diag}_0$, $\text{diag}_1$, . . . , $\text{diag}_{n-1}$} ii. Calculate the sum of multiplications (SOM):

$$ct_y = \sum_{i=0}^{n-1} mul_{ct,pt}(rot(ct_x, i), \text{diag}_i) \text{i.e.,}$$

using sum $\text{add}_{ct,ct}$ iii. return $ct_y$ d. Computation difficulty:

i. n−1 rotations and n operations of $\text{mul}_{ct,pt}$.

ii. Else, when $n_{nzd}$<n non-zero diagonals, the computation difficulty is reduced to $n_{nzd}$−1 rotations and $n_{nzd}$ operations of $\text{mul}_{ct,pt}$ FIG. 2 is an example diagram of a server 200 utilized to implement the disclosed embodiments. In some exemplary embodiments, server 200 may be a computerized system adapted to perform methods such as depicted in FIG. 3. Server 200 includes a processing circuitry 210 coupled to a memory 220, a storage 230, a network interface 240, and a FHE card 250. In an embodiment, the components of server 200 may be communicatively connected via a bus 260 such as, for example, a PCIe bus.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Memory 220 may be volatile (e.g., random access memory, etc.), non-volatile (e.g., read-only memory, flash memory, etc.), or a combination thereof. Storage 230 may include a non-volatile memory device, magnetic disk drive, optical disk drive, tape drive, and the like. Examples of memory 220 may include EEPROM, ROM, PROM, RAM, DRAM, SRAM, flash, firmware, programmable logic, and so on. Storage 230 may comprise an internal storage device, an attached storage device and/or a network-accessible storage device, and the like. Network interface 240 allows server 200 to communicate with external systems. Various communication protocols can be utilized by the network interface 240.

The memory 220 and/or storage 230 may store software required to execute an FHE program or application, that is, a software program that requires the execution of an FHE scheme to perform one or more homomorphic operations such as bootstrapping, and linear transformation.

The FHE program's repetitive execution, such as the linear transformation and bootstrapping processes, which according to the disclosed embodiment, is performed by an FHE accelerator 270 included or embedded in FHE card 250. It should be noted that software shall be construed broadly to mean any type of instructions, whether referred to as software, firmware, middleware, microcode, hardware description language, or otherwise. Instructions may include code (e.g., in source code format, binary code format, executable code format, or any other suitable format of code).

A FHE card 250 is configured to rapidly perform complex encryption, decryption, and homomorphic operations. In some exemplary embodiments, FHE card 250 performs addition, multiplication, and rotation of unencrypted matrixes with an encrypted vector, producing an encrypted output used during Linear Transformation. FHE card 250 can be installed in server 200 or operate as a standalone device. As noted above, FHE card 250 includes the FHE accelerator 270, FHE accelerator 270 includes a processor 271 and an internal memory 272, or several processors with internal memory designed for accelerating FHE scheme computational tasks. Processor 271 may include multiple cores that can handle multiple computation threads simultaneously. Internal memory 272 is a dedicated memory used by processor 271 to store the data for executing the FHE program and routines, such as bootstrapping and linear transformation. Such data may include auxiliary-data, encryption keys, indeterminate data, and the like. Internal memory 272 is a cache memory like, designed for high bandwidth, which means it can read and write data at high speeds, enabling processor 271 to quickly access the data stored therein. In some exemplary embodiments, internal memory 272 may be realized as on-die memory.

In one embodiment, FHE accelerator 270 can be realized as an ASIC. In other embodiments, FHE accelerator 270 can be realized as an FPGA, an ASSP, a SoC, and the like, or any other hardware logic components that can perform calculations or other manipulations of information.

FHE card 250 also includes an external memory 257 and a memory bus 258. Memory bus 258 is an interface through which processor 271 communicates with external memory 257. In some exemplary embodiments, external memory 257 may be an SDRAM, high bandwidth SDRAM (e.g., GDDR5, GDDR6), and high bandwidth memory (HBM). In some configurations, FHE card 250 may also include an interface 259 to interface with Bus 260, such as a PCIe.

In some exemplary embodiments, the size of internal memory 272 may be significantly smaller than the size of External Memory 257. Internal memory 272 may be realized as "on-die" memory, and the data stored therein allows for the efficient execution of an FHE scheme, specifically a bootstrapping process of such a program. For example, the difference between the memory size of the external memory and the internal memory may be the order of magnitude. In current technologies, the size of internal memory 272 is limited to 1 GB. Increasing the size of internal memory 272 would reduce the number of compute resources.

The disclosed embodiments describe a method for efficient execution of linear transformation process, which consequently impacts the execution of bootstrapping and other FHE programs execution. Additionally, or alternatively, the present disclosure includes computations, such as homomorphic I-DFT and DFT algorithms during the C2S and S2C steps of bootstrapping and evaluation of key switching operations. It should be understood that the embodiments described herein are not limited to the specific architecture illustrated in FIG. 2, and other architectures may be equally used without departing from the scope of the disclosed embodiments.

It will be appreciated that in FHE, a vector of complex numbers, plaintext polynomial, and ciphertext of any length can have a matrix representation. Such a matrix may be viewed as a three-dimensional (3D) matrix for the mathematical convenience of representing a plurality of diagonals (2D matrices) in the same space. Yet, it should be noted that each diagonal represents a different polynomial, a section of a polynomial, or any combination thereof. When performing matrix operations in FHE, such as matrix multiplication or matrix-vector multiplication, diagonals of matrices may be relevant. This can include various computations and operations, such as multiplication, addition, and rotation performed on encrypted data, ciphertext, plaintext, and the like, or any combination thereof.

It should be noted that in FHE, computations may employ RNS (Residue Number Systems) that efficiently represent and manipulate encrypted data by performing computations modulo a set of pairwise relatively prime moduli. RNS enhances operations like addition and multiplication. In each diagonal polynomial coefficients are associated with the columns and the residues with the rows of the matrix. Thus, the number of columns may be equal to the number of coefficients, while the number of rows may be equal to the number of residues. For example. a Matrix incorporating a C2S auxiliary-data may have 56 residues (rows), i.e., (L+K) polynomial residues, whereas a matrix incorporating an S2C auxiliary-data may have 28 residues (rows), while in both cases they may have 65536 coefficients (columns).

It will be appreciated that while the embodiments of linear transformation process described in the present disclosure refer to bootstrapping and FHE operations, the linear transformation process may also be utilized by other programs, such as linear regression, logistic regression, convolutional neural networks, and large language models.

Figure 3A:
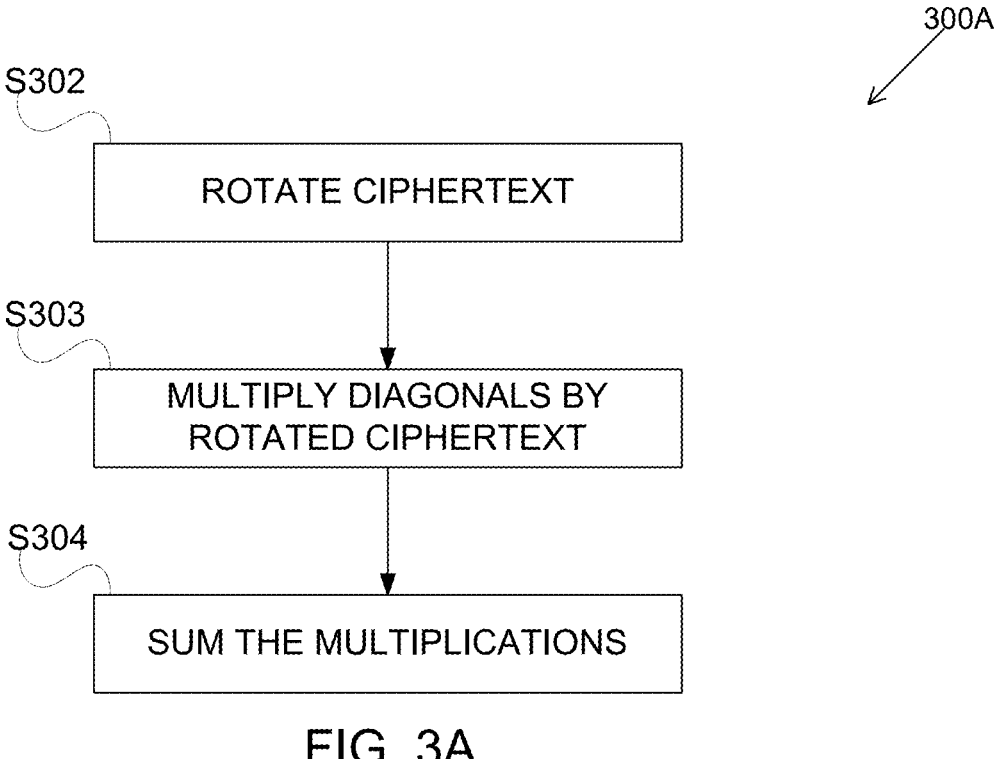
FIGS. 3A and 3B are a flowchart diagrams related to a method of optimizing FHE linear transformations for optimizing a bootstrapping process, in accordance with some of the disclosed embodiments.

In FIG. 3A a flowchart diagram of a method 300A of an optimized linear transformation process carried out in accordance with some of the disclosed embodiments. The linear transformation process is executed at runtime where its optimization is performed at the compilation or initialization stage, i.e., before runtime. The optimization of the linear transformation process is discussed in detail in FIG. 3B.

In some exemplary embodiments, the subject matter discloses a method designed to optimize a linear transformation process derived from the "Baby-step Giant-Step (BSGS) algorithm". BSGS algorithm was proposed as a part of the "Bootstrapping for HELib" article by Shai Halevi and Victor Shoup, at an annual international conference on the theory and applications of cryptographic techniques. Springer. 2015.

In some configurations, prior to runtime execution of the liner transformation process, diagonals may be encoded. The diagonal encoding step of BSGS includes two rotation parameters: $\beta$ (the number of baby steps) and $\gamma$ (the number of giant steps), where $\beta*\gamma=n$, and n is the number of encoded diagonals. Thus, dividing the diagonals into $\gamma$ groups of $\beta$ diagonals each, mathematically expressed: $\{diag_0, diag_1, \ldots diag_{\beta-1}\}$, $\{diag_\beta, diag_{\beta+1}, \ldots diag_{2\beta-1}\}$, $\ldots$ $\{diag_{(\gamma-1)\beta}, diag_{(\gamma-1)\beta+1}, diag_{n-1}\}$. Hence, following diagonals of the $k^{th}$ group of a plurality of groups $\gamma$ are pre-rotated by $-kn_1$.

According to the disclosed embodiment, a set of optimal rotation parameters is determined to allow an optimal tradeoff between compute resource and a memory utilization of an internal memory (e.g., memory 272). The various disclosed embodiments for selecting the set of optimal rotation parameters are discussed below. For example, a diagonal encoding step of n=8 diagonals, $\gamma=2$ groups, and $\beta=4$ diagonals per group, the diagonals of the first group are not rotated, where the diagonals of the second group are rotated by $-4$ positions. This is further demonstrated in TABLE 1, below.

TABLE 1

| Group | Diagonal | | | | | | | | | | | | | | | | | | |
|---|---|---|---|---|---|---|---|---|---|---|---|---|---|---|---|---|---|---|---|
| Group 1 | Diagonal 0 | $a_{00}$ | $a_{11}$ | $a_{22}$ | $a_{33}$ | $a_{44}$ | $a_{55}$ | $a_{66}$ | $a_{77}$ | 0 rot. > | $a_{00}$ | $a_{11}$ | $a_{22}$ | $a_{33}$ | $a_{44}$ | $a_{55}$ | $a_{66}$ | $a_{77}$ |
| | Diagonal 1 | $a_{01}$ | $a_{12}$ | $a_{23}$ | $a_{34}$ | $a_{45}$ | $a_{56}$ | $a_{67}$ | $a_{70}$ | 0 rot. >. | $a_{01}$ | $a_{12}$ | $a_{23}$ | $a_{34}$ | $a_{45}$ | $a_{56}$ | $a_{67}$ | $a_{70}$ |
| | Diagonal 2 | $a_{02}$ | $a_{13}$ | $a_{24}$ | $a_{35}$ | $a_{46}$ | $a_{57}$ | $a_{60}$ | $a_{71}$ | 0 rot. > | $a_{02}$ | $a_{13}$ | $a_{24}$ | $a_{35}$ | $a_{46}$ | $a_{57}$ | $a_{60}$ | $a_{71}$ |
| | Diagonal 3 | $a_{03}$ | $a_{14}$ | $a_{25}$ | $a_{36}$ | $a_{47}$ | $a_{50}$ | $a_{61}$ | $a_{72}$ | 0 rot. > | $a_{03}$ | $a_{14}$ | $a_{25}$ | $a_{36}$ | $a_{47}$ | $a_{50}$ | $a_{61}$ | $a_{72}$ |
| Group 2 | Diagonal 4 | $a_{04}$ | $a_{15}$ | $a_{26}$ | $a_{37}$ | $a_{40}$ | $a_{51}$ | $a_{62}$ | $a_{73}$ | rot. by −4> | $a_{40}$ | $a_{51}$ | $a_{62}$ | $a_{73}$ | $a_{04}$ | $a_{15}$ | $a_{26}$ | $a_{37}$ |
| | Diagonal 5 | $a_{05}$ | $a_{16}$ | $a_{27}$ | $a_{30}$ | $a_{41}$ | $a_{52}$ | $a_{63}$ | $a_{74}$ | rot. by −4> | $a_{41}$ | $a_{52}$ | $a_{63}$ | $a_{74}$ | $a_{05}$ | $a_{16}$ | $a_{27}$ | $a_{30}$ |
| | Diagonal 6 | $a_{06}$ | $a_{17}$ | $a_{20}$ | $a_{31}$ | $a_{42}$ | $a_{53}$ | $a_{64}$ | $a_{75}$ | rot. by −4> | $a_{42}$ | $a_{53}$ | $a_{64}$ | $a_{75}$ | $a_{06}$ | $a_{17}$ | $a_{20}$ | $a_{31}$ |
| | Diagonal 7 | $a_{04}$ | $a_{10}$ | $a_{21}$ | $a_{32}$ | $a_{43}$ | $a_{54}$ | $a_{65}$ | $a_{76}$ | rot. by −4> | $a_{43}$ | $a_{54}$ | $a_{65}$ | $a_{76}$ | $a_{04}$ | $a_{10}$ | $a_{21}$ | $a_{32}$ |

9 10

In some configurations, the encoding of diagonals is performed during the initialization process of the linear transformation process, thus not during runtime. To this end, the encoded diagonals are pre-loaded to the internal memory of the hardware accelerator, e.g., memory 272 of FHE accelerator 270.

In S302, the ciphertext may be rotated. The ciphertexts may be rotated $\beta-1$ positions per group. Thus, for each group, the ciphertext associated with the first diagonal is rotated 0 positions (no rotation), the ciphertext associated with the second diagonal is rotated 1 position, the ciphertext associated with the third diagonal is rotated 2 positions, and so on until the $\beta^{th}$ diagonal, where its associated ciphertext is rotated $\beta-1$ positions. Upon the completion of ciphertext rotations for one group, the rotated ciphertexts can be copied to the remaining groups respectively.

It should be noted that conventional ciphertext rotation includes phases that are repeated for each rotation, where the number of rotations (r) is determined by the number of baby steps $\beta$ minus 1, as the first rotation is equal to the input ciphertext (Ct-in). Additionally, ciphertext rotation requires a dedicated Key Switching Key (KSK) for each rotation. Thus, a conventional ciphertext rotation includes $(\beta-1)$ rotations, where each of which may have a dedicated KSK and its outcome is rotated ciphertext (Ct-out).

The ciphertext rotation can include the following phases: Digit decomposition, MultSum, Permute, and ModDown.

In the digit decomposition phase, the coefficients of the input polynomial undergo computations to generate several temporary polynomials in a larger temporary modulus QP.

the Permute phase. This phase obtains one MultSum outcome, and one sum of MultSum with an input polynomial and yields two output ciphertext polynomials (Ct-out).

It will be noted that the routine detailed above has to be repeated for each rotation. A rotation, including key-switching, requires the following computation:

$$L\left(3 + d_{num} + \frac{2}{d_{num}}\right)NTTs \text{ and } N\left(L^2\left(1 + \frac{2}{d_{num}}\right) + 2L(d_{num} + 2)\right)$$

multiplications per rotation. For an example $d_{num}=2$ there are 6L NTTs and $N(2L^2+8L)$ multiplications per one rotation.

Therefore, it can be concluded that ciphertext rotations pose a significant burden on computational executions, primarily due to the involvement of the Key-Switching procedure.

According to the disclosed embodiments, a boosting technique configured with one or more of the determined rotation parameters is utilized to perform S302. The disclosed boosting technique is discussed in greater detail below.

In S303, diagonals are multiplied by rotated ciphertext. Each rotated ciphertext is multiplied by its associated diagonal $\gamma$ times, i.e., one diagonal per group, where $\gamma$ is the number of groups.

According to the example depicted in S302, the product of multiplying diagonals by rotated ciphertext step will yield:

| | | | | | | | | |
|---|---|---|---|---|---|---|---|---|
| Group 1 | $mul_{pt,ct}$ | $a_{00}x_0$ | $a_{11}x_1$ | $a_{22}x_2$ | $a_{33}x_3$ | $a_{44}x_4$ | $a_{55}x_5$ | $a_{66}x_6$ | $a_{77}x_7$ |
| | $mul_{pt,ct}$ | $a_{01}x_1$ | $a_{12}x_2$ | $a_{23}x_3$ | $a_{34}x_4$ | $a_{45}x_5$ | $a_{56}x_6$ | $a_{67}x_7$ | $a_{70}x_0$ |
| | $mul_{pt,ct}$ | $a_{02}x_2$ | $a_{13}x_3$ | $a_{24}x_4$ | $a_{35}x_5$ | $a_{46}x_6$ | $a_{57}x_7$ | $a_{60}x_0$ | $a_{71}x_1$ |
| | $mul_{pt,ct}$ | $a_{03}x_3$ | $a_{14}x_4$ | $a_{25}x_5$ | $a_{36}x_6$ | $a_{47}x_7$ | $a_{50}x_0$ | $a_{61}x_1$ | $a_{72}x_2$ |
| Group 2 | $mul_{pt,ct}$ | $a_{40}x_0$ | $a_{51}x_1$ | $a_{62}x_2$ | $a_{73}x_3$ | $a_{04}x_4$ | $a_{15}x_5$ | $a_{26}x_6$ | $a_{37}x_7$ |
| | $mul_{pt,ct}$ | $a_{41}x_1$ | $a_{52}x_2$ | $a_{63}x_3$ | $a_{74}x_4$ | $a_{05}x_5$ | $a_{16}x_6$ | $a_{27}x_7$ | $a_{30}x_0$ |
| | $mul_{pt,ct}$ | $a_{42}x_2$ | $a_{53}x_3$ | $a_{64}x_4$ | $a_{75}x_5$ | $a_{06}x_6$ | $a_{17}x_7$ | $a_{20}x_0$ | $a_{31}x_1$ |
| | $mul_{pt,ct}$ | $a_{43}x_3$ | $a_{54}x_4$ | $a_{65}x_5$ | $a_{76}x_6$ | $a_{07}x_7$ | $a_{10}x_0$ | $a_{21}x_1$ | $a_{32}x_2$ |

40

This decomposition is necessary to limit the noise growth resulting from the subsequent multiplication with the Key-Switching-Key (MultSum).

In the MultSum phase, the decomposed array of polynomials undergoes two inner products, each with a part of the Key-Switching-Key, to obtain a ciphertext decryptable by the desired secret key. This phase consists of several polynomial additions and multiplications. The process is then repeated with one of the inputs changed to generate a second result.

In the permute phase, the elements of a polynomial that encodes data may be rearranged. This rearrangement is done in a deterministic pattern according to a parameter r to obtain a new polynomial, which encodes the rotation of the original data by r.

In the ModDown phase, a polynomial with coefficients modulo a large modulus QP undergoes division by P and rounding/flooring/ceiling to obtain a polynomial in the original modulus Q. This is done to enable further key-switching operations.

Each rotation in the overall ciphertext rotations process includes digit decomposition, MultSum, and Permute computation phases. A first ciphertext polynomial undergoes digit decomposition, yielding an input to the MultSum. Together with the KSK input, the MultSum performs multiplications and additions, producing two polynomials for It should be noted that the example depicts only 2 groups for the sake of simplifying the explanation herein. However, in a typical linear transformation the number of groups, ($\gamma$) may be significantly greater than 2. For further processing, the groups may be assigned an index k, where $0 \leq k \leq \gamma-1$.

In S304, the products may be summed. The products of each group k are summed separately, followed by rotating the SOM (sum of multiplications) of each group by $\beta \times k$ positions, where k is the group index. In an embodiment, S304 is concluded by summing the rotated SOM of all the groups. It should be noted that k of the first group is zero, thus the first group is not rotated. In an embodiment, S304 contiguous accumulation ("ConAcc") configured based on one or more of the determined rotation parameters is utilized to perform S304. The disclosed ConAcc routine is discussed in greater detail below. It should be noted that whether or not to utilize the ConAcc routine is a configurable parameter (ConAcc activation flag) that is determined as part of the set of optimal rotation parameters.

In view of the above linear transformation founded on basic BSGS process can be summarized as follows:
   a. Input: Ciphertext $ct_x$=Encrypt($x \in \mathbb{C}^n$), matrix $A \in \mathbb{C}^{n \times n}$, and integers $\beta$, $\gamma$ such that $\beta = \lceil n/\gamma \rceil$
   b. Output: Ciphertext $ct_y$ such that y=Decrypt($ct_y$)$\approx$Ax
   c. Process:
      i. Encode the diagonals of matrix A into n plaintext polynomials {$diag_0$, $diag_1$, ...., $diag_{n-1}$} ii.

For $0 \leq k \leq \gamma - 1$ calculate $acc_k =$ $$\sum_{i=0}^{\beta-1} mul_{ct,pt}\left(rot(ct_x, i), rot(diag_{k\beta+i}, -k\beta)\right)$$

iii.

Calculate $ct_y = \sum_{k=0}^{\gamma-1} rot(acc_k, +k\beta)$ iv. Return $ct_y$ d. Computation effort:

i. Total of $\beta+\gamma-2$ rotations and n operations of $mul_{ct,pt}$ ii. Computation effort is reduced if the number of non-zero encoded diagonals $n_{nzd} < n$ and $$\beta = \left\lceil \frac{n_{nzd}}{\gamma} \right\rceil.$$

iii. Based on symmetry analysis, computation effort may be minimized by choosing $\beta=\gamma$.

In summary, a conventional and basic linear transformation operates on a BSGS process, and yields exactly the same results as the process demonstrated in FIG. 3. However, the disclosed linear transformation operated on a BSGS process involves $\beta+\gamma-2$ rotations and n times $mul_{ct,pt}$, whereas the conventional linear transformation involves $n-1$ rotations and n times $mul_{ct,pt}$. Therefore, the computational effort difference between the two (i.e., conventional linear transformation algorithm and Halevi's BSGS linear transformation algorithm) is reflected in the number of rotations, since the number of multiplications is similar. The difference between the two can be expressed as: $\beta \; \gamma-1 > \beta+\gamma-2$, since $n=\beta*\gamma$. For example, given 8 diagonals, $\beta=4$, $\gamma=2$ shows the number of rotations is reduced from 7 to 4.

The technical problems addressed by the disclosed subject matter are the computational efforts and memory footprint associated with rotations, multiplications, and sum operations, as manifested in S302 through S304, as described below. As disclosed herein, the computational efforts and memory footprint are optimized through a determination of the optimal rotational parameters.

Specifically, each $mul_{pt,ct}$ operation includes 2NL multiplications, where N is the number of polynomials in a plaintext, L is the number of residues, and 2 is the number of ciphertexts. Since only $n_{nzd}$ (nonzero) polynomials are relevant, then the total number multiplications are $2n_{nzd}NL$. However, the operation requires significantly more operations due to the Key-Switching procedure, which comes to a total of $$L\left(3 + d_{num} + \frac{2}{d_{num}}\right) NTTs,$$

and $$N\left(L^2\left(1 + \frac{2}{d_{num}}\right) + 2L(d_{num} + 2)\right)$$

multiplications ($d_{num}$ is a residue parameter). For example, for $d_{num}=2$ the total operations are 6L NTTs plus $N(2L^2+8L)$ multiplications per one rotation, resulting in substantial computational efforts and memory footprint Additionally, during a basic BSGS process, $\beta$ two polynomials ciphertexts are generated. Each of these is multiplied by up to $\gamma$ plaintexts encoded diagonals. The products are then rotated and summed to obtain the linear transformation result $$ct_y = \sum_{k=0}^{\gamma-1} rot\left(\sum_{i=0}^{\beta-1} mul_{ct,pt}(ct_i, pt_{k,i}), GiantStep_k\right).$$

It should be noted that the basic BSGS process operates by generating and storing baby steps, meaning it generates all $\beta$ ciphertexts, stores them, and only then performs the summation. This approach requires peak intermediate memory of $\beta$ ciphertexts in addition to at least one ciphertext holding the intermediate sum, leading to a large memory footprint.

In view of the shortcomings of the basic BSGS process for linear transformation, such cannot meet the technical objective of the present disclosure, which aims to reduce the memory size and computational efforts of hardware accelerators, thereby reducing chip area, and power consumption. This would result in reduced computational complexity, shorter execution times, smaller memory footprint, and reduced memory bandwidth, thereby making linear transformation more efficient.

One technical solution is employing an innovative technique for classifying optimal parameters for the linear transformation algorithm. In some exemplary embodiments, parameter classification may be determined by evaluating possible parameter combinations that minimize runtime while staying within the memory footprint limit.

Another technical solution is implementing an innovative Baby-Step Boosting (hereinafter "Boosting") technique for ciphertext rotations. In some embodiments of the disclosed subject matter, the output of the baby-step stage is a set of $\beta$ rotated versions of the input ciphertext. The Boosting technique, with parameter bf, performs the ciphertext rotations in $\lceil (\beta-1)/bf \rceil$ iterations, numbered i=1 to $\lceil (\beta-1)/bf \rceil$. Each iteration takes ciphertext input from the outputs of the previous iteration, and bf key-switching keys, and generates the next bf rotated versions of the ciphertext input. Upon completion of all iterations, $\beta$ rotated ciphertext outputs are available. This Boosting technique enhances the data-computation tradeoff, consequently optimizing the performance of the linear transformation process.

Yet another technical solution is implementing the Con-Acc routine for sum operations in a linear transformation process, and the like. In some exemplary embodiments, ConAcc starts by setting up $\gamma$ accumulator ciphertexts, then creates $\beta$ ciphertexts one at a time. Each time a ciphertext is created, the ConAcc routine updates each of the $\gamma$ partial sums. This technique uses less intermediate memory since it requires only a number of $\gamma$ accumulator ciphertexts plus one for the current ciphertext being processed.

Figure 3B:
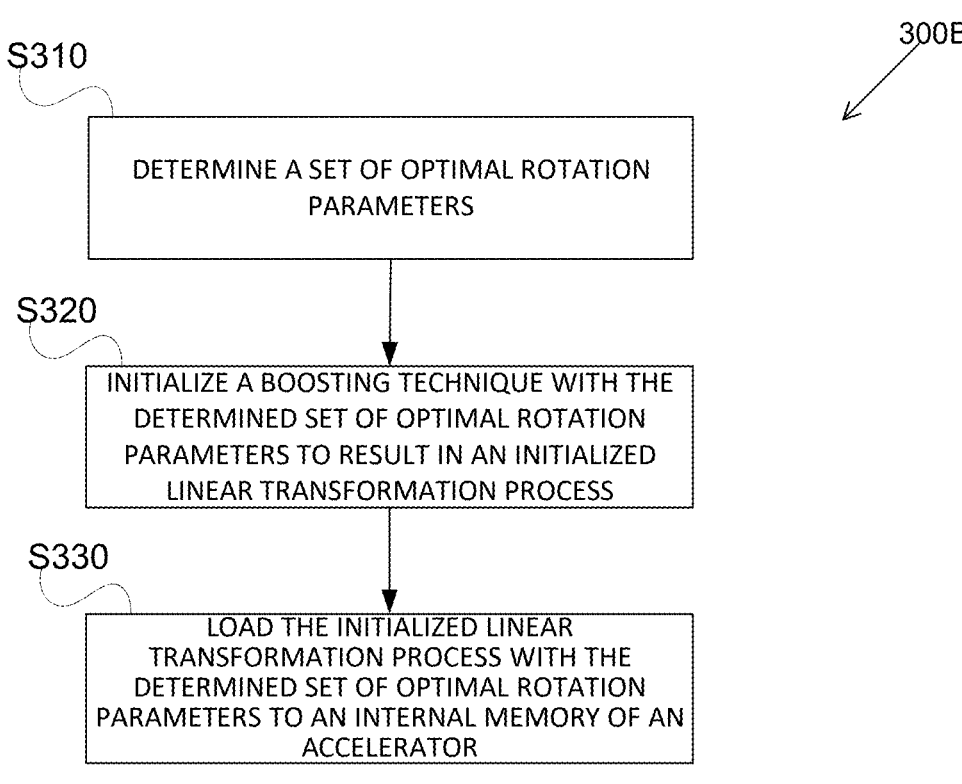

FIG. 3B is an example flowchart 300B of a method for optimizing compute runtime and memory footprint of a linear transformation process according to the disclosed embodiments. The method may be performed during compilation or initializing of an application, such as an FHE application or program. The method may be performed by a processing circuitry that is outside of a hardware accelerator, such as an FHE accelerator. For example, the method may be performed by processing circuitry 210 of server 200 of FIG. 2. The linear transformation process is executed at runtime by a hardware accelerator, such as the FHE accelerator 270 of FIG. 2. The linear transformation process is discussed in FIG. 3 and is configured with a set of optimal rotation parameters.

As shown in FIG. 3B, the method may include determining a set of optimal rotation parameters (S310). The optimal rotation parameters define an optimal tradeoff between runtime compute resources and a memory footprint for a runtime execution of the linear transformation.

The optimal rotation parameters may include determining parameters $\beta$, $\gamma$, a boosting factor {bf} (to be described in detail further below), and a ConAcc activation flag (i.e., whether or not the ConAcc routine should be used as part of the linear transformation process, as described in detail further below).

Initially, the linear transformation and hardware constraints of the FHE accelerator (e.g., FHE accelerator 270, FIG. 2) constraints may be defined or obtained:

a. Operation: linear transformation of a ciphertext by a matrix with nonzero diagonals.

b. Global program parameters: given values of $d_{num}$ and L.

c. Possible parameter values: defined ranges for $\beta$, bf, and a Boolean for ConAcc activation flag, such as depicted in the table below.

d. Hardware constraints: total memory limit for the hardware processing capabilities, number of accelerators, multipliers, and CPU cores.

In an embodiment, parameter combinations may be generated:

a. Determine all possible combinations of $\beta$, $\gamma$ (where $\gamma=\lceil n/\beta \rceil$), and ConAcc.

b. Example: For n=128, $d_{num}$=2, and L=40: $\beta \in \{16,32, 64,128\}$, $\gamma=128/\beta$,bf$\in\{1,4,8,16\}$, ConAcc$\in\{$True, False$\}$, which results in a total of 4×4×2=32 configurations.

In an embodiment, each configuration may be evaluated as part of the program configurations space by computing the runtime for each configuration, which could be measured by the number of NTT operations or the like. Additionally, or alternatively, the total intermediate memory and Key-Switching Key (KSK) memory required for each configuration for evaluating memory footprint.

In an embodiment, an optimal configuration as part of optimal program configuration may be selected:

a. Filter configurations based on the hardware memory constraint (e.g., 200 MB).

b. Among the configurations that satisfy the memory constraint, select the one with the shortest program runtime.

For a linear transformation program example, a given memory limit is 200 MB, the optimal configuration may be $\beta$=64, $\gamma$=2, bf=4, and ConAcc activation flag=True. This configuration achieves the shortest runtime while meeting the memory constraint.

TABLE 2

| Config. # | $\beta$ | $\gamma$ | bf | ConAcc |
|---|---|---|---|---|
| 1 | 128 | 1 | 1 | TRUE |
| 2 | 64 | 2 | 1 | TRUE |
| 3 | 32 | 4 | 1 | TRUE |
| 4 | 16 | 8 | 1 | TRUE |
| 5 | 128 | 1 | 4 | TRUE |
| 6 | 64 | 2 | 4 | TRUE |
| 7 | 32 | 4 | 4 | TRUE |
| 8 | 16 | 8 | 4 | TRUE |

TABLE 2-continued

| Config. # | $\beta$ | $\gamma$ | bf | ConAcc |
|---|---|---|---|---|
| 9 | 128 | 1 | 8 | TRUE |
| 10 | 64 | 2 | 8 | TRUE |
| 11 | 32 | 4 | 8 | TRUE |
| 12 | 16 | 8 | 8 | TRUE |
| 13 | 128 | 1 | 16 | TRUE |
| 14 | 64 | 2 | 16 | TRUE |
| 15 | 32 | 4 | 16 | TRUE |
| 16 | 16 | 8 | 16 | TRUE |
| 17 | 128 | 1 | 1 | FALSE |
| 18 | 64 | 2 | 1 | FALSE |
| 19 | 32 | 4 | 1 | FALSE |
| 20 | 16 | 8 | 1 | FALSE |
| 21 | 128 | 1 | 4 | FALSE |
| 22 | 64 | 2 | 4 | FALSE |
| 23 | 32 | 4 | 4 | FALSE |
| 24 | 16 | 8 | 4 | FALSE |
| 25 | 128 | 1 | 8 | FALSE |
| 26 | 64 | 2 | 8 | FALSE |
| 27 | 32 | 4 | 8 | FALSE |
| 28 | 16 | 8 | 8 | FALSE |
| 29 | 128 | 1 | 16 | FALSE |
| 30 | 64 | 2 | 16 | FALSE |
| 31 | 32 | 4 | 16 | FALSE |
| 32 | 16 | 8 | 16 | FALSE |

Figure 5:
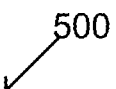
FIG. 5 illustrates a scatter plot, of runtime/memory tradeoff, in accordance with some of the disclosed embodiments.
Figure 5:
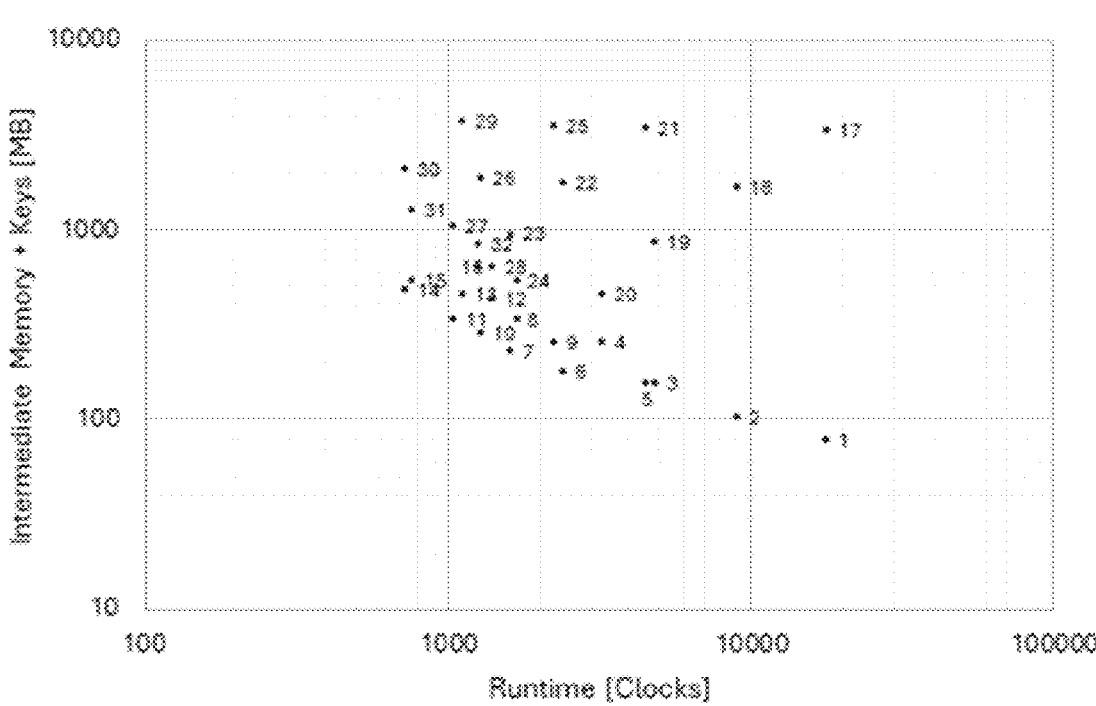

The runtime/memory tradeoff of the example in TABLE 2 is depicted in a scatter plot 500 in FIG. 5. Each point in the collection is indexed by its configuration number.

As also shown in FIG. 3B, method 300B may include programming the Boosting technique with the determined set of optimal rotation parameters (S320). S320 may include setting the Boosting technique with the determined parameters. As noted above the Boosting technique, when executed at runtime as part of the linear transformation process, performs at least one iteration that yields rotated ciphertexts. The iterations are performed based on the determined set of optimal rotation parameters and at least one key switching key (KSK). The Boosting technique may be executed as part of S302 discussed above. The operation of the Boosting technique is further discussed with reference to FIG. 4.

In an embodiment, S320 may include setting Boosting technique or the linear transformation process to utilize ConAcc routine based on the value of the ConAcc activation flag. This flag defines if the ConAcc routine should be implemented or not, and the decision is based on the optimal utilization of the internal memory. The ConAcc routine may be executed as part of S303 and S304 discussed above.

The outcome of S310 and S320 is a complied or initialized linear transformation process that when executed at runtime enables optimal tradeoff between compute resources and a reduced memory footprint on the program level.

As further shown in FIG. 3B, method 300B may include loading the complied or initialized linear transformation process programmed with the determined set of optimal rotation parameters to an internal memory of a hardware accelerator (S330). In an embodiment, the internal memory is memory 272 of FHE accelerator 270. The determined rotation parameters ensure that the memory required to store at least the KSK for the rotation is less than the size of the internal memory and during runtime, the compute resources of processor 271 are not exhausted.

Figure 4:
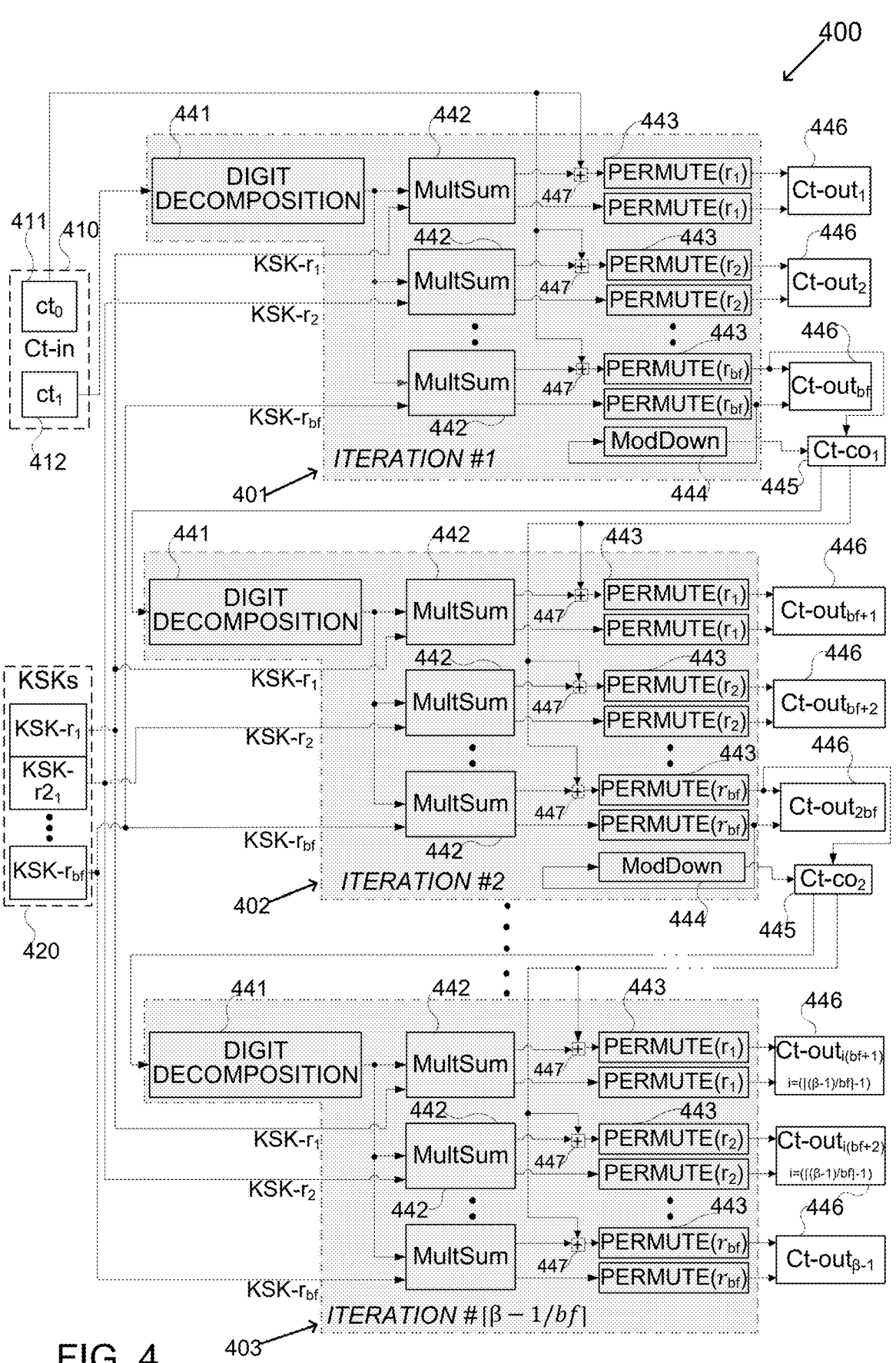
FIG. 4 shows a block diagram depicting a boosting technique for ciphertexts rotation, in accordance with some of the disclosed embodiments.

It should be understood that the operations described herein cannot be performed using the human mind or by performing the operation using paper and pencil. A human operator applies subjective criteria to select/simulate/predict, leading to results that are not consistent between different human operators, and often not consistent between the same human performing the same task repeatedly, and in particular at the speeds required to provide an operable solution. The number of possible permutations for rotation parameters and parameter values selection, by far exceeds any practical use of the human mind. FIG. 4 shows a block diagram 400 depicting the Boosting technique for ciphertexts rotation, in accordance with some of the disclosed embodiments. In some exemplary embodiments, Boosting 400 includes a plurality of iterations indexed as follows: Iteration #1 (401), Iteration #2 (402), through Iteration #⌈(β−1)/bf⌉ (403) hereinafter referred to as Iteration 401 through Iteration 403 respectively. In some exemplary embodiments, the iterations are identical except for the last Iteration, i.e., Iteration 403, which differs from the other iterations by lacking ModDown 444 phase.

In some exemplary embodiments, {bf} is a boosting factor, which may be determined with the optimal rotation parameters. Practically, the boosting factor {bf} defines an optimal number of KSKs to participate in the baby-step stage. This means choosing the best configuration, such as depicted in the example of the table above. the table itemized the number of KSKs that satisfy an optimal compute-data tradeoff and the runtime/memory tradeoff depicted in the example in FIG. 5.

In some exemplary embodiments, Iteration 401 may be fed by ciphertext input $ct_1$ 412, and ciphertext input $ct_0$ 411, while the following iterations use a Carry-out Ciphertext (Ct-co_i) 445 generated by the previous iteration as a ciphertext input. Additionally, or alternatively, each iteration may be fed by a total of {bf} Key Switching Keys (KSKs), and together with ciphertext inputs generate the next {bf} rotated versions of $ct_{in}$ 410. After all iterations are generated, a p ciphertexts outputs (ct_out) 446 are available for the linear transformation process (e.g., S303).

In some exemplary embodiments, the Iterations may include the following phases: Digit decomposition 441, Sum of multiplications (MultSum) 442, Permute 443, and Mod-Down 444.

In a digit decomposition 441 phase, coefficients of the input polynomial undergo computations to generate several temporary polynomials in a temporary, larger modulus QP. The decomposition is required in order to limit the noise growth resulting from the following multiplication with the KSK 420 in a MultSum 442 phase.

In MultSum 442 phase, the decomposed array of polynomials undergoes two inner products, each with a part of the Key-Switching-Key to obtain a ciphertext decryptable by a desired secret key. This phase comprises several polynomial additions and polynomial multiplications. The process is then repeated with one of the inputs changed to generate a second result.

In some exemplary embodiments, the number of MultSum 442 phases per iteration is dictated by the number of KSKs 420, which is defined by {bf} (practically defining the number of rotations), therefore the indexed $KSK_1$ through $KSK_{bf}$. For example, electing configuration #10 from the table above, the number of KSKs will be 8. In some exemplary embodiments, the number of iterations may be defined by $$\left\lceil \frac{\beta - 1}{bf} \right\rceil.$$

According to the same example, there will be 8 iterations. It should be noted that ciphertext inputs $ct_1$ 412 and $ct_0$ 411 are added to Ct-out as is. In Permute 443, elements of a polynomial that encodes some data may be rearranged. The rearranging is done in a deterministic pattern according to a parameter r to obtain a new polynomial, which encodes the rotation of the original data by r In the ModDown phase, a polynomial with coefficients modulo a large modulus QP undergoes division by P and rounding/flooring/ceiling to obtain a polynomial in the original modulus Q. This is done so further key-switching operations can be performed.

The description above indicates, Iteration 401 obtains and processes two polynomials of a ciphertexts inputs, $ct_0$ 411 and $ct_1$ 412. $Ct_1$ 412 is used as an input to Digit decomposition 441 phase and $ct_0$ 411 is added, by an Adder 447, to an outcome of MultSum 442 of Iteration 401. The result of Adder 447 is then fed to Permute 443 phase of Iteration 401.

It should be noted that the two polynomials of a ciphertexts inputs, $ct_0$ 411 is in a modulus Q and some scale. However, the result of the MultSum phase 442 is in a larger modulus QP, and scale larger by P. In some exemplary embodiments, $ct_0$ 411 may be first multiplied by the constant P in order to match the scale and modulus of the $ct_0$ 411 and the MultSum 442 polynomials.

In some exemplary embodiments of the Boosting 400 technique, iterations following Iteration 401 conduct a similar process, with the exception of obtaining two ciphertext inputs that are derived from Ct-co_i 445 of the previous iteration. In some exemplary embodiments, Ct-co_i 445 generates the two ciphertext polynomials from the last Permute 443 and ModDown 444 phases of the previous iteration. For example, Permute (r_bf) and ModDown 444 of Iteration 402 feed Ct-co_2 445 that generates the ciphertext inputs for Iteration 403. In light of the above, it is requested that only the MultSum 442 and Permute 440 phases be dependent on the rotation r Therefore, Digit decomposition 441 and Mod-Down 444 can be computed once and used for all rotations, $r_0$ through $r_{\beta-1}$.

In some exemplary embodiments, Boosting 400 allows for performing only a single digit decomposition per iteration, as Digit Decomposition 441 does not depend on which rotation is performed. Additionally, Boosting 400 also allows for using only {bf} rotation KSKs, i.e., the optimal number of KSKs. Given the heavy computation burden posed by Digit Decomposition 441, this approach improves the data-computation tradeoff and optimizes overall linear transformation algorithm. It should be noted that the total amount of Digit Decomposition 441 operations when using Boosting 400 technique for ciphertexts rotation of the present disclosure is $$\left\lceil \frac{\beta - 1}{bf} \right\rceil.$$

In an exemplary embodiment with maximum KSKs, there is 1 iteration and β−1 KSK, i.e., bf=β−1. In this approach, the Digit Decomposition 441 phase is calculated once for all rotations, and the ModDown 444 phase is deferred to the multiplication of diagonals by rotated ciphertext in S303.

In summary, the maximum KSKs approach reduces the number of digit decompositions from β−1 to 1 and eliminates ModDown operations from 2(β−1) to 0, thereby reducing computational efforts. However, since only operations on baby-steps benefit from the Boosting technique, the optimal ratio between $\beta$ and $\gamma$ shifts towards more baby-steps and fewer giant-steps, thus for minimal computation effort $\beta/\gamma >> 1$. Moreover, the maximum KSKs approach requires $(\beta-1)$ KSKs, which incurs a heavy memory footprint cost.

For example, in a typical scenario during C2S bootstrapping where multiplication by a matrix with 63 nonzero diagonals is required, utilizing an optimal ratio $\beta/\gamma > 1$ yields $\beta=32$ and $\gamma=2$, thus necessitating 31 KSKs. Given that the memory size of a KSK ranges from 26 to 45 Megabytes (MB) results in a total KSK size of 806 MB to 1395 MB at the baby-step stage.

In an exemplary embodiment of minimum KSKs having $\beta-1$ iterations and one KSK, i.e., bf=1. this may be intended to reduce large KSK memory size, which incurs harsh memory bandwidth requirements, by minimizing the total KSK size at the expense of increased computation.

Considering the baby-step rotation set B={0, res, 2res, . . . , $(\beta-1)$res}, where (res) is the rotation increment using only one KSK (rotation by res). By implementing the mathematical identity rot(ct, a+b)=rot(rot(ct, a), b), a rotation by m·res$\in$B by applying rot(ct, res) m consecutive times, thereby allowing for retaining only one rotation at any given time. However, performing a rotation on the result of a previous rotation mandates the ModDown operation on one of the polynomials.

Referring back to the previous example, only a 26 to 45 MB KSK will be used for the Baby-Step stage, and performing Digit Decompositions 441 will sum up to 4.5$(\beta-1)$L NTTs.

It will be appreciated that maximum KSKs practice and minimum KSKs practice are opposites in terms of computational efforts. Maximum KSKs practice emphasizes computational operations, while minimum KSKs practice prioritizes reducing memory footprint and memory bandwidth.

In some exemplary embodiments, the boosting technique includes a contiguous accumulation (ConAcc) routine, which may be utilized in S303 and S304 for multiplying diagonals by rotated ciphertext and summing the products of the multiplications, respectively. It will be reminded that the ciphertexts outputs are multiplied by up to $\gamma$ plaintexts, and groups of the products are rotated and summed:

$$ct_y = \sum_{k=0}^{\gamma-1} rot\left(\sum_{i=0}^{\beta-1} mul_{ct,pt}(ct_i, pt_{k,i}), GiantStep_k\right)$$

as per S303 and S304 of the linear transformation algorithm.

In the commercially available basic BSGS algorithm, all $\beta$ ciphertexts outputs are stored and then multiplied, rotated, and summed. In contrast, the ConAcc routine accumulates products of ciphertexts outputs by their associated diagonals on the fly. In some exemplary embodiments, the ConAcc routine initializes $\gamma$ accumulator ciphertexts. It generates the $\beta$ baby ciphertexts one by one, and for each generated ciphertext, computes its contribution to each of the following $\gamma$ partial sums, as represented by the following equation:

$$acc_k = \sum_{i=0}^{\beta-1} mul_{ct,pt}(ct_i, pt_{k,i}) \text{ for } 0 \le k < \gamma.$$

In some exemplary embodiments, the accumulators are summed upon completion of all $\beta$ ciphertexts' contributions:

$$ct_y = \sum_{k=0}^{\gamma-1} rot(acc_k, GiantStep_k).$$

It will be appreciated that the ConAcc routine requires peak intermediate memory of only $\gamma$ ciphertexts in addition to one ciphertext holding the current baby ciphertext. Therefore, the ConAcc routine reduces the peak intermediate memory during runtime since usually $\beta >> \gamma$. In summary, the number of ciphertexts stored is $> \beta+1$ in the commercially available basic BSGS algorithm, whereas the number of ciphertexts stored is $\gamma+1$ when utilizing the disclosed ConAcc routine in S303 and S304.

In some exemplary embodiments, the baby step rotations and giant step rotations are grouped in two sets B and G such that the set of each possible sums b+g, where b$\in$B and g$\in$G is a superset of the required rotation set for the linear transform, which is the set of nonzero diagonals indices (B and G span the required indices).

Baby step rotations do not necessarily have finer granularity than giant steps. For example, for a required rotation set (nonzero diagonal indices set) of {10,14,17,20,24,27,30, 34,37}, it is possible to choose the set of baby step rotations as B={10,20,30} and the set of giant step rotations as G={0,4,7}. The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing compute runtime and memory footprint of a linear transformation process, comprising:
determining a set of optimal rotation parameters, wherein the optimal rotation parameters provide an optimal tradeoff between runtime compute resources and a memory footprint for a runtime execution of the linear transformation process; wherein the linear transformation process is a linear transformation of a ciphertext by a matrix with nonzero diagonals; wherein the rotation parameters include: a number of baby steps ($\beta$), a number of giant steps ($\gamma$), a boosting factor (bf), and a ConAcc activation flag; wherein the ConAcc activation flag indicates whether a contiguous accumulation routine is utilized as part of the linear transformation process; and wherein the optimal tradeoff comprises selecting, among configurations that satisfy a hardware memory constraint, one with a shortest program runtime;
initializing the linear transformation process to run a boosting technique with the determined set of optimal rotation parameters, wherein the boosting technique, when executed at runtime as part of the linear transformation process, performs at least one iteration that yields rotated ciphertexts, wherein the at least one iteration is based on the determined set of optimal rotation parameters and at least one key switching key (KSK), and wherein the boosting factor (bf) defines a number of key switching keys (KSKs) used in the at least one iteration; and
loading the initialized linear transformation process to an internal memory of a hardware accelerator.

2. The method of claim 1, further comprising: determining the optimal rotation parameters based on a size of the internal memory, hardware constraints of the hardware accelerator including a total memory limit for the hardware processing capabilities, a number of accelerators, multipliers, and CPU cores, and global parameters of a program including the linear transformation process.

3. The method of claim 2, wherein determining the optimal rotation parameters further comprises:
generating a plurality of configurations based on possible combinations of the global program parameters, including rotation parameters;
evaluating runtime compute resources and memory footprint required for each configuration of the plurality of configurations; and
selecting a configuration out of the plurality of configurations that satisfies the hardware memory constraint and has the shortest program runtime.

4. The method of claim 3, wherein the runtime compute resources are based in part on a number of digit decomposition operations, including number-theoretical transforms (NTTs) and multiplications.

5. The method of claim 1, further comprising:
initializing the boosting technique to perform a contiguous accumulation routine, when the ConAcc activation flag is set to true.

6. The method of claim 5, wherein performing the contiguous accumulation routine further comprises:
generating $\beta$ ciphertext outputs one by one; and for each generated ciphertext output, accumulating the ciphertext output's contribution to each of $\gamma$ accumulator ciphertexts corresponding to $\gamma$ partial sums by computing the products of the ciphertext output by associated diagonals.

7. The method of claim 6, wherein the contiguous accumulation routine further comprises: reducing peak memory footprint in the process of multiplying diagonals by rotated ciphertext and summing products resulting from the multiplying during runtime.

8. The method of claim 1, wherein performing the at least one iteration further comprises:
computing one digit decomposition phase that generates temporary polynomials in a larger modulus QP from coefficients of an input polynomial;
computing a number of bf MultSum phases with bf KSKs, each MultSum phase computing two inner products between a decomposed array of polynomials and respective parts of a KSK; and
computing a number of bf permute phases of two ciphertext polynomials, wherein each MultSum phases outputs two ciphertext polynomials for the permute phases, and wherein each permute phase deterministically rearranges elements of a polynomial according to a parameter r to encode a rotation.

9. The method of claim 8, further comprising:
spanning a set of nonzero diagonal indices of a matrix representing the linear transformation using a set of baby step rotations (B) and a set of giant step rotations (G).

10. The method of claim 1, wherein the linear transformation process is executed as part of an fully homomorphic encryption (FHE) program, and wherein the hardware accelerator is an FHE fully homomorphic encryption (FHE) accelerator having an on-die memory as the internal memory.

11. A non-transitory computer-readable medium storing a set of instructions for optimizing compute runtime and memory footprint of a linear transformation process, the set of instructions comprising:
one or more instructions that, when executed by one or more processors of a device, cause the device to:
determine a set of optimal rotation parameters, wherein the optimal rotation parameters provide an optimal tradeoff between runtime compute resources and a memory footprint for a runtime execution of the linear transformation process; wherein the linear transformation process is a linear transformation of a ciphertext by a matrix with nonzero diagonals; wherein the rotation parameters include: a number of baby steps ($\beta$), a number of giant steps ($\gamma$), a boosting factor (bf), and a ConAcc activation flag; wherein the ConAcc activation flag indicates whether a contiguous accumulation routine is utilized as part of the linear transformation process; and wherein the optimal tradeoff comprises selecting, among configurations that satisfy a hardware memory constraint, one with the shortest program runtime;
initialize the linear transformation process to run a boosting technique with the determined set of optimal rotation parameters, wherein the boosting technique, when executed at runtime as part of the linear transformation process, performs at least one iteration that yields rotated ciphertexts, wherein the at least one iteration is based on the determined of set optimal rotation parameters and at least one key switching key (KSK), and wherein the boosting factor (bf) defines a number of key switching keys (KSKs) used in the at least one iteration; and load the initialized linear transformation process to an internal memory of a hardware accelerator.

12. A system for optimizing compute runtime and memory footprint of a linear transformation process comprising:

one or more processors configured to:

determine a set of optimal rotation parameters, wherein the optimal rotation parameters provide an optimal tradeoff between runtime compute resources and a memory footprint for a runtime execution of the linear transformation process; wherein the linear transformation process is a linear transformation of a ciphertext by a matrix with nonzero diagonals; wherein the rotation parameters include: a number of baby steps ($\beta$), a number of giant steps ($\gamma$), a boosting factor (bf), and a ConAcc activation flag; wherein the ConAcc activation flag indicates whether a contiguous accumulation routine is utilized as part of the linear transformation process; and wherein the optimal tradeoff comprises selecting, among configurations that satisfy a hardware memory constraint, one with the shortest program runtime;

initialize the linear transformation process to run a boosting technique with the determined set of optimal rotation parameters, wherein the boosting technique, when executed at runtime as part of the linear transformation process, performs at least one iteration that yields rotated ciphertexts, wherein the at least one iteration is based on the determined set optimal rotation parameters and at least one key switching key (KSK), and wherein the boosting factor (bf) defines a number of key switching keys (KSKs) used in the at least one iteration; and load the initialized linear transformation process to an internal memory of a hardware accelerator.

13. The system of claim 12, wherein the one or more processors are further configured to:

determine the optimal rotation parameters based on a size of the internal memory, hardware constraints of the hardware accelerator including a total memory limit for the hardware processing capabilities, a number of accelerators, multipliers, and CPU cores, and global parameters of a program, including the linear transformation process.

14. The system of claim 13, wherein the one or more processors, when determining the optimal rotation parameters, are configured to:

generate a plurality of configurations based on possible combinations of the global program parameters, including rotation parameters;

evaluate runtime compute resources and memory footprint required for each configuration of the plurality of configurations; and select a configuration out of the plurality of configurations that satisfies the hardware memory constraint and has the shortest program runtime.

15. The system of claim 14, wherein the runtime compute resources are based in part on a number of digit decomposition operations, including number-theoretical transforms (NTTs) and multiplications.

16. The system of claim 12, wherein the one or more processors are further configured to:

initialize the boosting technique to perform a contiguous accumulation routine, when the ConAcc activation flag is set to true.

17. The system of claim 16, wherein the one or more processors, when performing the contiguous accumulation routine, are configured to:

generate $\beta$ ciphertext outputs one by one; and for each generated ciphertext output, accumulate the ciphertext output's contribution to each of $\gamma$ accumulator ciphertexts corresponding to $\gamma$ partial sums by computing the products of the ciphertext output by associated diagonals.

18. The system of claim 17, wherein the one or more processors, when performing the contiguous accumulation routine, are further configured to:

reduce peak memory footprint in the process of multiplying diagonals by rotated ciphertext and summing products resulting from the multiplying during runtime.

19. The system of claim 12, wherein the one or more processors, when performing the at least one iteration, are configured to:

compute one digit decomposition phase that generates temporary polynomials in a larger modulus QP from coefficients of an input polynomial;

compute a number of bf MultSum phases with bf KSKs, each MultSum phase computing two inner products between a decomposed array of polynomials and respective parts of a KSK; and compute a number of bf permute phases of two ciphertext polynomials, wherein each MultSum phases two ciphertext polynomials for the permute phases, and wherein each permute phase deterministically rearranges elements of a polynomial according to a parameter r to encode a rotation.

20. The system of claim 19, wherein the one or more processors are further configured to:

span a set of nonzero diagonal indices of a matrix representing the linear transformation using a set of baby step rotations (B) and a set of giant step rotations (G).

21. The system of claim 12, wherein the linear transformation process is executed as part of an fully homomorphic encryption (FHE) program, and the hardware accelerator is an fully homomorphic encryption (FHE) accelerator having an on-die memory as the internal memory.

* * * * *